Patented Nov. 16, 1926.

1,607,325

UNITED STATES PATENT OFFICE.

CURRY ORA WALPER, OF DETROIT, MICHIGAN, ASSIGNOR, BY DIRECT AND MESNE ASSIGNMENTS, TO STANDARD PLASTERING SYSTEM, OF DETROIT, MICHIGAN, A CORPORATION OF MICHIGAN.

ADHESIVE PLASTIC COMPOSITION.

No Drawing.    Application filed September 25, 1922. Serial No. 590,503.

This invention relates to a composition of matter particularly intended for use as a surface finish for interior walls and ceilings of buildings.

It has for its object to provide a fireproof covering which will adhere to rough plaster or plaster boards.

A further object of the invention is to provide a material for a plaster finishing coat which will be less resilient than the finishing coats now in use so that the acoustic properties of halls and auditoriums may be improved by the use of such material.

A still further object of the invention is to provide a plastic composition which may be used in the formation of molded ornamental work.

Asbestos occurs in veins of fibrous magnesium silicate surrounded by rock which is usually of a similar composition but devoid of the fibrous crystalline structure. In the process of manufacture of asbestos the fibrous portion is removed and the surrounding rock containing fragments of fibrous asbestos is commonly discarded or sold as a waste product under the name of "rough asbestic" or "tailings". When this rough asbestic is pulverized by crushing, the material forms a flour-like substance resembling talc with intermingled short fibers of the crystalline asbestos.

The plastic composition of the present invention consists of this crushed rough asbestic mixed with gypsum, and in cases where the mixture is intended to be used as a surface coating to be applied by a plasterer, lime is added to give the mixture the proper working quality for smoothness of application. A suitable quantity of water will be added to give the proper consistency for easy manipulation and a suitable retarder or hastener will be added according to the conditions. For example the addition of borax retards the rate of setting, while common salt or alum will accelerate the rate of setting. Several forms of commercial retarder consisting of various mixtures of organic matter have also been found to be suitable.

Where the acoustic property is the principal consideration, the crushed rough asbestic may be used in a proportion as high as sixty per cent of the mixture. This will give a surface which when struck gives a dull sound like that yielded by a similar blow applied to blotting paper, whereas the ordinary surface of plaster containing gypsum yields a hollow ringing sound, a quality highly undesirable in an auditorium.

The use of plastic decorations in ceilings of public buildings and auditoriums is becoming increasingly popular. Such decorations have heretofore commonly been made of gypsum composition which becomes extremely hard when it is dry and in many cases it has been necessary to cover expensive decorations with various non-resilient materials to improve the acoustic qualities of the rooms in which such decorations were used.

The composition of matter of the present invention is particularly adapted for the production of such plastic ornamentation as well as for the finishing coat for smooth sound reflecting surfaces.

Ordinarily the crushed rough asbestic will not constitute more than twenty-five per cent of the composition and it may be used in even smaller proportions without losing the advantage of its fireproof qualities. An amount as low as five per cent added to a lime-gypsum plaster will materially improve its fireproof qualities, though when this small percentage is used the composition will of course be much harder and more resilient than when the percentage of asbestic is increased.

The lime will preferably comprise less than twenty per cent of the mixture, its function being to improve the texture of the wet plastic composition, so that a smoother surface can be obtained when it is applied as a surface finishing coat and also so that the composition will flow more readily into a mold when the composition is used for decorations in relief.

A composition suited for ordinary use will therefore consist of crushed rough asbestic about twenty-five per cent, gypsum about sixty per cent, and lime about fifteen per cent, in addition to which there will be a small quantity of retarder or hastener.

The term "gypsum" is to be understood as including any of the commercial forms of gypsum intended for use as plasters or cements and capable of receiving a set after admixture with water. The gypsum as found in the earth is heated to about 120° to cause the loss of a portion of the water of crystalization, the resulting product usually consisting of a mixture of anhydrous calcium sulphate, together with the di-hydrate and the hemihydrate forming an unstable system which in the presence of sufficient moisture will acquire a set to form a porous hard mass. The commercial products vary somewhat in the relative proportion of the constituent compounds.

I claim:

A plastic composition having the characteristic, when employed as a water-setting composition, of providing acoustic qualities to walls, etc., said composition consisting of an admixture of rough asbestic crushed to a fine fibrous powder, gypsum, and lime.

In testimony whereof I affix my signature.

CURRY ORA WALPER.